United States Patent [11] 3,597,902

| [72] | Inventor | Clyde H. Williams |
| | | Coldwater, Mich. |
| [21] | Appl. No. | 775,282 |
| [22] | Filed | Nov. 13, 1968 |
| [45] | Patented | Aug. 10, 1971 |
| [73] | Assignee | The Scott & Fetzer Company |
| | | Bronson, Mich. |

[54] UTILITY VACCUM CLEANER
3 Claims, 6 Drawing Figs.

[52] U.S. Cl. .................................................. 55/337,
15/327, 15/353, 55/379, 55/410, 55/467
[51] Int. Cl. .................................................. B01d 50/00
[50] Field of Search .................................... 55/276,
334, 337, 356, 357, 378, 379, 459, 467, 472, 410;
15/353, 352, 327 D

[56] References Cited
UNITED STATES PATENTS

| 2,327,553 | 8/1943 | Ponselle | 15/327 D |
| 2,594,417 | 4/1952 | Gerber | 15/327 D |
| 2,863,524 | 12/1958 | Buda | 55/379 |

Primary Examiner—Frank W. Lutter
Assistant Examiner—Bernard Nozick
Attorney—Hill, Sherman, Meroni, Gross & Simpson ABSTRACT: A utility vacuum cleaner having a two-piece housing including an upper portion forming a lid for a lower-canister portion in which dirt is directly collected. The lid portion is an integrally formed unit providing a mounting for a motor fan unit and means for attaching a filter element thereto. The lid portion further provides an upwardly directed outlet from an increased pressure chamber formed between the motor fan unit and the inner surface of the lid. The filter unit provides a spring-biased framework for supporting a cloth baglike filter to prevent the collapse thereof when air is drawn therethrough. The lower canister is characterized by a baffled inlet arranged to prevent the inlet flow of collected dirt and dust particles from directly impinging against the filter unit and to promote the even distribution of the collected particles around the canister portion by spiraling the dirt laden airstream in the canister.

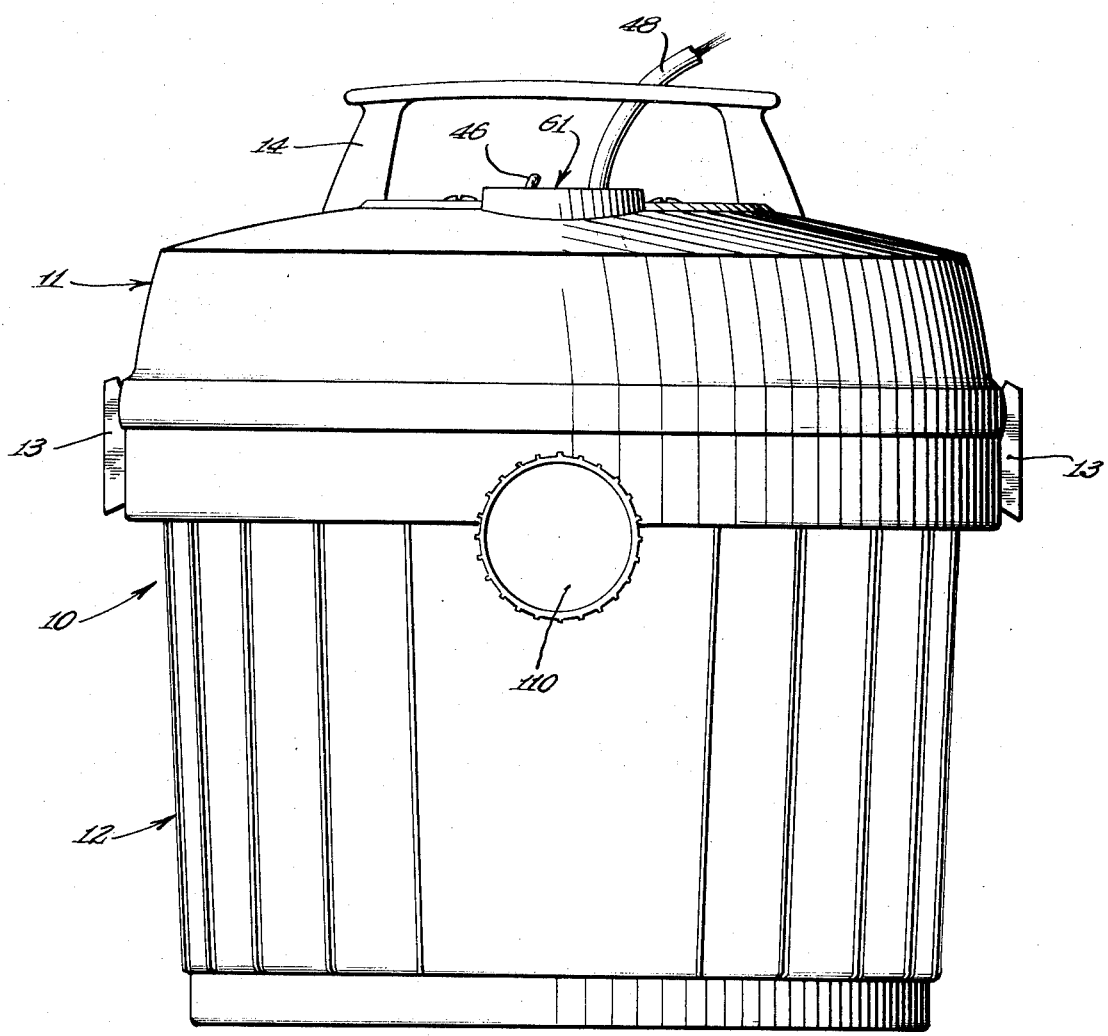

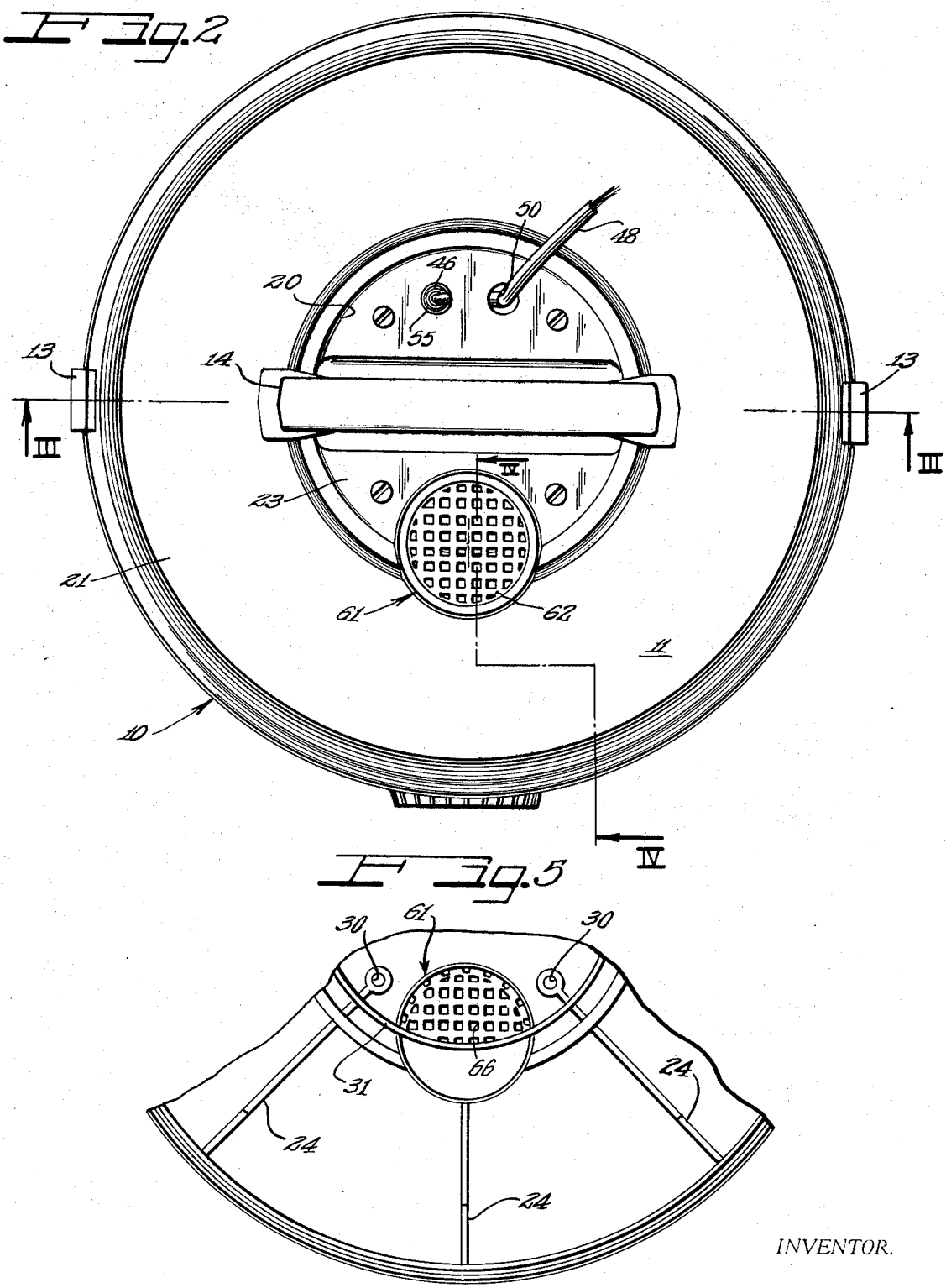

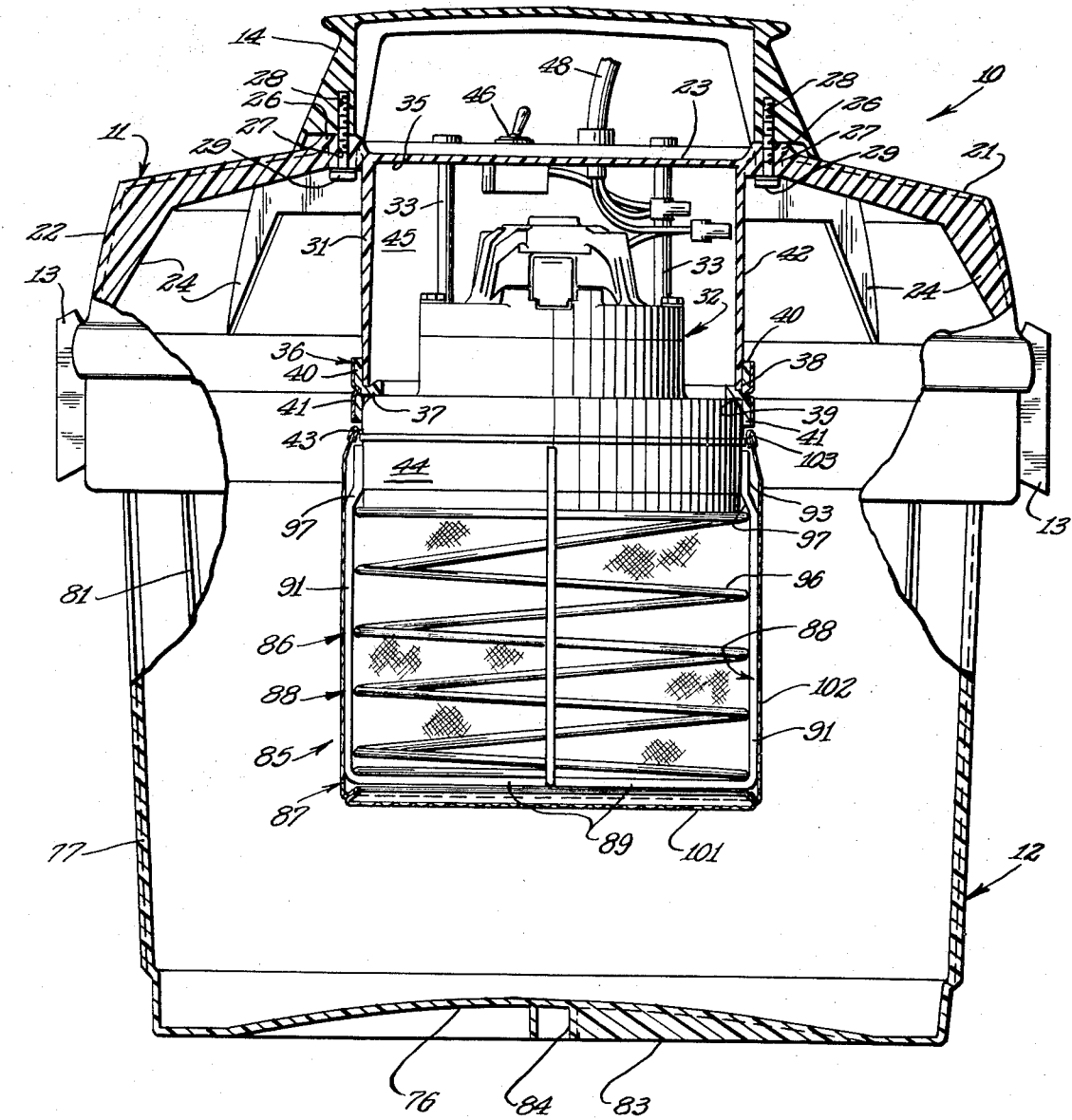

Patented Aug. 10, 1971 3,597,902
4 Sheets-Sheet 4
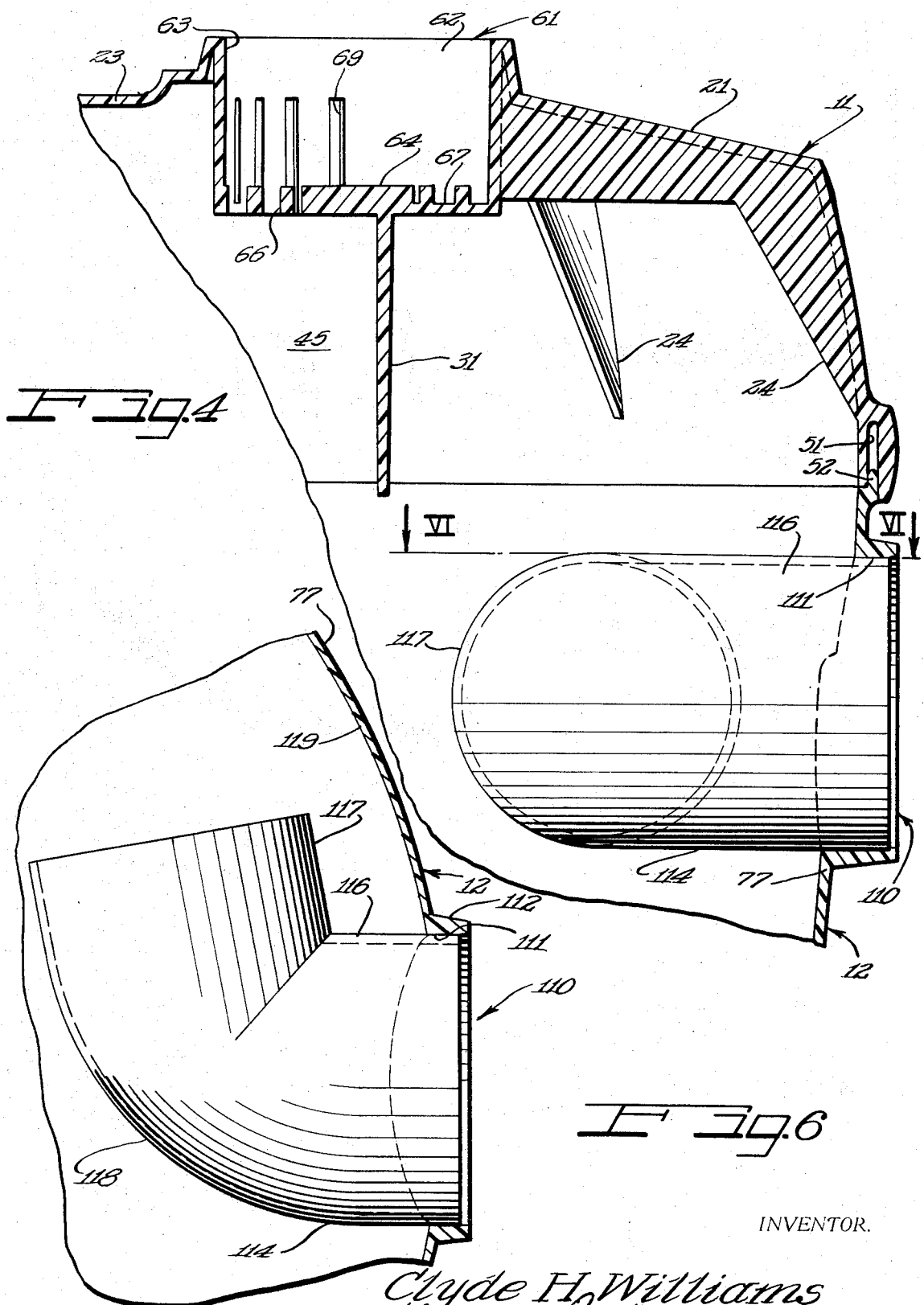
INVENTOR.
Clyde H. Williams
BY Hill, Sherman, Meroni, Gross & Simpson
ATTORNEYS

3,597,902

UTILITY VACCUM CLEANER

BACKGROUND OF THE INVENTION
1. Field of the Invention

This invention relates to a vacuum cleaner, and more particularly refers to a canister-type utility vacuum cleaner having an integrally formed lid portion providing an integral mounting for a motor-fan unit, means for receiving a filter bag unit and an outlet, and having a canister portion for receiving the collected particles characterized by a baffled inlet.

2. Description of the Prior Art

Prior art devices usually require a dirt separating filter bag into which the dirt laden airstream is directed.

Debris normally found in a workshop or on an outside patio includes large wood chips, leaves and paper, all of which present an acute problem with respect to clogging and rapid filling of a bag filter. Additionally, debris of the nature described hereinabove requires a relatively high suction.

SUMMARY OF THE INVENTION

A utility vacuum cleaner, constructed in accordance with the present invention, includes a housing composed of an upper lid portion and a lower canister portion clamped together in sealing engagement by means of toggle clamps. The lid portion is an integral cup-shaped member providing a centrally disposed, downwardly depending internal flange for receiving a motor-fan unit in a manner to form a chamber on the outlet side of the fan which will be under increased pressure when the fan is operating. Furthermore, the lid portion is characterized by an outlet for permitting the filtered air to be exhausted from the outlet chamber. It is contemplated by the present invention that the outlet be formed as an integral part of the lid and suitably screened to prevent foreign particles from entering the increased pressure chamber wherein the same could damage the motor-fan unit.

Instead of the usual filter bag, the motor-fan unit has an inlet side of the fan connected to the interior of a large canister or receptacle and the inlet of the motor-fan unit is shielded by a dirt separating filter, not to gather or collect the dirt but only to prevent the dirt from passing through the fan. Thus, the dirt separated from the airstream is collected directly in the larger canister or bucketlike container situated under the lid and motor fan unit.

In accordance with the present invention, an openly constructed frame work including a coil spring having a substantially cylindrical configuration stretches a cylindrically formed dirt separating filter over the inlet of the motor-fan unit. The filter unit framework is adapted to engage a shroud surrounding the motor-fan unit, and the cylindrical filter includes an elasticized annular upper edge portion for engaging the shroud to form a seal therebetween. Thus, the present invention provides a filter unit which presents a relatively large filtering area and also which resists collapse under the high suction forces associated with a utility vacuum cleaner.

To promote collection of the relatively large particles of debris normally found in the environment of use of a utility vacuum cleaner, the canister portion includes a baffle inlet for directing the inlet flow of the collected particles in a swirling pattern tangentially around an interior surface of the canister, thereby to prevent the inlet flow from directly impinging against the centrally disposed filter unit. The swirling motion of the collected particles provides an even distribution of the collected particles around the canister unit. Whereupon they will settle gravitationally in the bottom of the canister or bucketlike container.

DESCRIPTION OF THE DRAWINGS

In the accompanying drawings, forming a part of this specification and in which like reference characters are employed to designate like parts through the same FIG. 1 is a side elevational view of a utility vacuum cleaner embodying the present invention;

FIG. 2 is a top plan view of the structure shown in FIG. 1

FIG. 3 is a cross sectional view partially in elevation taken on line III–III of FIG. 2

FIG. 4 is a fragmentary enlarged sectional view taken on line IV–IV of FIG. 2

FIG. 5 is a fragmentary bottom plan view of the lid portion of the device shown in FIGS. 1 4 and FIG. 6 is a fragmentary cross sectional view taken on line VI–VI of FIG. 4.

DESCRIPTION OF THE PREFERRED EMBODIMENT

In the drawings, there is shown a utility vacuum cleaner designated generally as 10, which is particularly adapted to use in a home work shop, an outside patio or other environment wherein dirt particles of a character not ordinarily found in a domestic environment of a home are to be collected. The vacuum cleaner generally includes a lid portion 11 and a canister or bucketlike container or tank 12. The lid is connected to the canister by means of toggle clamps 13, 13. To facilitate transporting the assembled vacuum cleaner unit, a handle 14 is attached to the lid portion 11.

The lid 11 is formed with a slightly domed upper surface 21 and a depending sidewall 22. Additionally, a substantially cup-shaped recess 20 is formed in the upper surface 21 of the lid 11 and is centrally located thereon concentrically inwardly of the outer wall 22. To increase the rigidity of the lid portion 11, a series of circumferentially spaced ribs 24 are provided with a first segment extending radially outwardly and substantially parallel to the upper surface 21 and a second segment extending downwardly along an interior surface of the sidewall 22. The preferred embodiment illustrated herein includes eight such ribs, although the number of such ribs may be varied depending upon the amount of rigidity desired and the space available.

To provide a means for attaching the handle 14 to the lid portion 11, the lid is formed with a pair of bosses 26, 26 disposed in diametrically opposed relationship and each having an aperture 27 formed therethrough. Also the handle 14 is provided with internally threaded apertures 28, 28 spaced to be in alignment with the apertures 27, 27. A pair of screws 29, 29 or other suitable fastening means pass through the apertures 27, 27 and threadedly engage the apertures 28, 28 of the handle 14, thereby to secure the handle to the lid portion 11.

In accordance with the present invention, the lid portion 11 constitutes an integral molding having means for mounting a motor-fan unit generally designated at 32. The motor-fan mounting means includes a centrally disposed cylindrical flange 31 which depends upon a lower surface 35 of the lid 11. Additionally, the lid 11 is formed with four apertures such as 30 passing through the upper domed portion 21 thereof. Four bolts such as 33 pass through the apertures 30 and threadedly engage sockets formed in the motor-fan unit 32, thereby to secure the motor-fan unit 32 within the cylindrical flange 31. With the bolts 33 properly engaged, the motor-fan unit 32 is drawn upwardly against a sealing ring 36, thereby to form a sealed chamber 45 bounded by the underneath side 35 of the lid 11, an interior surface of the depending flange 31 and a shroud 44 of the motor-fan unit 32.

The annular sealing ring 36 is formed with a T*shaped cross section providing a radially extending flange 37 which is disposed between a terminal end portion 38 of the cylindrical flange 31 and a shoulder 39 formed on the shroud 44 of the motor-fan unit 32. Additionally, the annular sealing ring 36 provides axially extending segments 40 and 41 which, respectively, sealingly engage an outer cylindrical surface 42 of the cylindrical flange 31 and an outer cylindrical surface 43 formed on the shroud 44 encircling the motor-fan unit 32.

The motor-fan unit is electrically connected to a conductor 48 which passes through a sealed aperture 50 formed in the lid 11 and which includes an electrical connection for attachment to the usual domestic electric supply outlet. The motor-fan unit 32 is controlled by means of an electrical switch 46 which is electrically connected in series in the conductor 48. The switch 46 passes through an appropriately formed aperture 55 in the lid 11 and is secured to the lid by suitable fastening means.

As best shown in FIG. 4, a seal is provided between the lid portion 11 and the canister portion 12 by an axially extending groove 51 formed in the lid and an annular lip 52 formed on the canister portion which fittingly engages the axially extending groove. With the toggle clamps 13 in their clamped position, the lip 52 is tightly drawn into the groove 51, thereby to form a hermetic seal between the lid 11 and the canister 12.

In accordance with the present invention and as illustrated in FIGS. 2, 4 and 5, the lid 11 includes an air outlet 61 formed as an integral part thereof for discharging filtered air from the chamber 45 to the atmosphere. The outlet 61 if formed with a cup-shaped recess 62 integrally molded as part of the lid 11 and having a vertically extending cylindrical sidewall 63. As best seen in FIG. 2 the outlet 61 is radially offset from the longitudinal axis of the lid 11.

A bottom surface 64 of the recess 62 is shaped to provide an integral plastic screen having the appearance of a grillwork. In particular, the bottom surface 64 has a portion overlying the chamber 45 which is foraminated as at 66 to provide a screen having a plurality of apertures, such as 66, forming air passages extending from the chamber 45 to the atmosphere. Outwardly of the screened portion, the bottom surface 64 is formed with depressions such as 67 to provide a grillwork which aesthetically blends with the screened portion.

To increase the outlet area and hence the airflow capacity, the cylindrical sidewall 63 of the recess 62 is lanced to provide a series of circumferentially spaced, elongated slots such as 69 which form additional air passageways from the chamber 45 to the atmosphere. Thus, the total outlet area is the sum of the area provided by the slots 69 and the area provided by the apertures 66.

Referring to FIG. 3, the canister 12 is a molded plastic member comprising a bucketlike container having a slightly domed bottom wall 76 and an upstanding cylindrical sidewall 77. The upper portion of the sidewall 77 is enlarged as at 79, and the enlarged portion terminates in the lip 52 which seats within the groove 51 of the lid 11. The cylindrical sidewall 77 further includes vertically extending ribs 81, which project radially outwardly from an outer surface of the cylindrical wall portion. The ribs 81 increase the rigidity of the cylindrical sidewall 77, thereby to provide a canister 12 having sufficient rigidity to adequately support the lid 11 containing the motor-fan fan unit 32.

The domed bottom wall 76 is also formed with ribs as at 83 which extend radially outwardly from a centrally disposed cylindrical flange 84 and which project downwardly from a lower surface of the bottom wall. The ribs 83 are tapered outwardly so that the canister 12 presents a flush lower surface forming means for resting the vacuum cleaner 10 on a flat surface.

In accordance with the present invention, the cleaner 10 also includes a substantially cylindrical-shaped filter unit generally designated as 85 for separating debris from the air stream. The filter unit 85 includes a wire support frame 86 and a filter bag 87 stretched over the frame and formed of a fine mesh cloth or other suitable material. The wire frame 86 includes four substantially L-shaped wire members 88 disposed in an X-shaped arrangement with one leg portion 89 of each member lying in a common horizontal plane and extending outwardly from a common point, and another leg portion 91 of each member extending upwardly from an outermost end of the first leg portion. An upper end portion of each upwardly extending leg 91 is inwardly offset as at 93. The offset portions 93 of each wire member 88 engage the outer cylindrical surface 43 of the shroud 44, and the spring action of the wire members provides a sufficient spring force to retain the filter unit 85 in an assembled relationship with the motor-fan unit 32.

In accordance with the principles of the present invention a large, loosely wound spring 96 fits within the cradle formed by the wire members 88 and has one end thereof bottomed against the horizontally disposed leg portions 89 and has an other portion thereof engaged with a shoulder 97 formed on each upwardly extending leg 91 by the offset portions 93, thereby to retain the spring within the frame work defined by the L*shaped members. Therefore, the coil spring 96 and the L-shaped members 88 cooperate to form a substantially cylindrical, open framework for supporting the filter 87.

The filter, in the form illustrated, has a generally cup-shaped configuration including a circular bottom wall portion 101 which is sewn to a cylindrical sidewall portion 102 having an interior diameter to provide a close-fitting relationship between the filter bag 87 and the frame work 86. An upper terminal edge of the cylindrical sidewall 102 of the filter bag 87 includes an annular elastic portion 103 for engaging the outer cylindrical surface 43 of the shroud 44 to form a seal therewith for preventing particles of dirt and debris from entering the motor-fan unit 32. The frame work 86 supports the filter bag 87 and holds the same in its intended cylindrical shape regardless of the forces exerted by the suction of the motor-fan unit 32.

To assist in maintaining the filter unit 85 free from collected particles that might tend to clog the unit, the canister 12 is formed with a baffled inlet generally designated as 110 and illustrated in FIGS. 4 and 6. The baffled inlet 110 includes an inlet port 111 formed in the sidewall 77 of the canister 12 and is characterized by an outwardly projecting flange 112. An inlet baffle element 114 is fittingly received within the inlet port 111. The baffle element 114 is a molded plastic member having a substantially elbow-shaped configuration. In particular, the baffle element 114 includes a first cylindrical portion 116 projecting substantially radially inwardly of the inlet port 111 and a second cylindrical portion 117 connected by a smooth curve 118 to the first cylindrical portion and formed at an obtuse angle thereto.

The baffle element 114 is formed to direct the stream of collected dust particles tangentially to an interior cylindrical surface 119 of the canister sidewall 77. In this manner, the collected particles are directed in a swirling path around the interior of the canister 12 to prevent the particles from directly impinging against the centrally disposed filter unit 85 and to promote the even distribution of the collected particles within the canister. Whereupon the dirt and debris will settle gravitationally into the bottom of the container or canister 12. By swirling the airstream laden with dirt and debris, the heavy dirt particles will be directed radially outwardly. The airstream will be changed in direction so that dirt free air will tend to be displaced under pressure through the motor-fan unit into the cleaner outlet.

In operation, the motor-fan unit 32 is connected by means of the electric supply wire 48 to an electric supply source. With the motor-fan unit 32 properly supplied with electric current through the control switch 46, the fan draws air upwardly through the filter unit 85, into the chamber 45 and out through the outlet 61, thereby to create a vacuum within the canister 12. The suction created within the canister 12 causes dirt to be collected by a wand or other attachment fitted onto the baffled inlet 110. The collected dirt and debris enter the canister 12 through the baffled inlet 110 into the interior of the canister in a swirling pattern around the centrally disposed filter unit 85.

To remove the collected dirt and debris the toggle clamps 13 are moved to their released position and the entire lid portion 11 including the integrally formed motor mounting means, the motor-fan 32 and the filter unit 85 with the lid 11 removed, is lifted from the canister. The canister 12 may be manually gripped under the enlarged portion 79 and utilized as a convenient bucket for carrying the collected dirt and debris to a disposal location.

Although various minor modifications might be suggested by those versed in the art, it should be understood that I wish to embody within the scope of the patent warranted hereon all such modifications as reasonably and properly come within the scope of my contribution to the art.

I claim:

1. In a utility vacuum cleaner, a bucketlike container having an upstanding cylindrical sidewall formed with an inlet opening in said sidewall, and an integral cover and suction unit superjacent said container and carried thereby, said unit comprising a lid comprising a top wall and a sidewall of circular cross section and formed with a centrally disposed cylindrical flange depending from said top wall into the interior of said container concentrically inwardly of said sidewall, a motor of the suction unit secured to said top wall inwardly of said flange and a fan housing of the suction unit sealed against the end of said flange to form a sealed outlet chamber interiorly of said flange, said suction unit having a bag filter secured about said fan housing, said top wall having formed therein an outlet opening having an axially extending cylindrical flange disposed to radially overlie at least in part said outlet chamber and extending inwardly into said outlet chamber at least in part, and a wall in said lid extending across said outlet opening radially, said last-mentioned wall having formed therein a grid with portions of the grid in register with said outlet chamber being apertured to form through air passages, the axially extending flange in said outlet chamber being lanced to form additional slotted through air passages, thereby forming a screened outlet opening through which filtered air may be discharged without admitting foreign objects.

2. In a utility vacuum cleaner as defined in claim 1, said inlet opening extending into an annular space remaining between said integral cover and suction unit and said sidewall of said container, said inlet opening comprising an elbow-shaped baffle to direct the stream of dirt laden air tangentially into the annular space, whereby particles of dirt are prevented from directly impinging against the suction unit and will be gravitationally directed into the container.

3. In a utility vacuum cleaner as defined in claim 1, wherein said bag filter is a cylindrical filter bag surrounding a coiled compression spring to hold the bag in shape against airflow forces tending to collapse the bag.